(12) United States Patent  (10) Patent No.: US 8,006,899 B2
Wein  (45) Date of Patent: Aug. 30, 2011

(54) ENTRANCE TICKET WITH LIGHTING EFFECT

(76) Inventor: Michael Wein, Houston, TX (US)

( * ) Notice: Subject to any disclaimer, the term of this patent is extended or adjusted under 35 U.S.C. 154(b) by 205 days.

(21) Appl. No.: 12/534,813

(22) Filed: Aug. 3, 2009

(65) Prior Publication Data

US 2011/0024499 A1    Feb. 3, 2011

(51) Int. Cl.
*G06K 5/00* (2006.01)
(52) U.S. Cl. .................... 235/382; 235/494; 362/190
(58) Field of Classification Search .................. 235/382, 235/494; 362/190
See application file for complete search history.

(56) References Cited

U.S. PATENT DOCUMENTS

| 6,404,409 | B1 | 6/2002 | Solomon |
| 2001/0018660 | A1 | 8/2001 | Sehr |
| 2002/0064042 | A1* | 5/2002 | Leslie ........................ 362/191 |
| 2005/0188167 | A1 | 8/2005 | Squibbs et al. |
| 2006/0244435 | A1 | 11/2006 | Watanabe et al. |
| 2009/0212116 | A1* | 8/2009 | Purton et al. ................ 235/491 |
| 2011/0058363 | A1* | 3/2011 | Fattizzi ....................... 362/190 |

* cited by examiner

*Primary Examiner* — Allyson N Trail
(74) *Attorney, Agent, or Firm* — Buskop Law Group, PC; Wendy Buskop

(57) ABSTRACT

A ticket having an embedded processor in a substrate for creating a synchronous lighting effect at a controlled access venue and a method for creating a lighting effect at a controlled access venue while controlling access to the venue simultaneously using a ticket that coordinates with the performance allowing a holder of the ticket to perform with the performance.

20 Claims, 5 Drawing Sheets

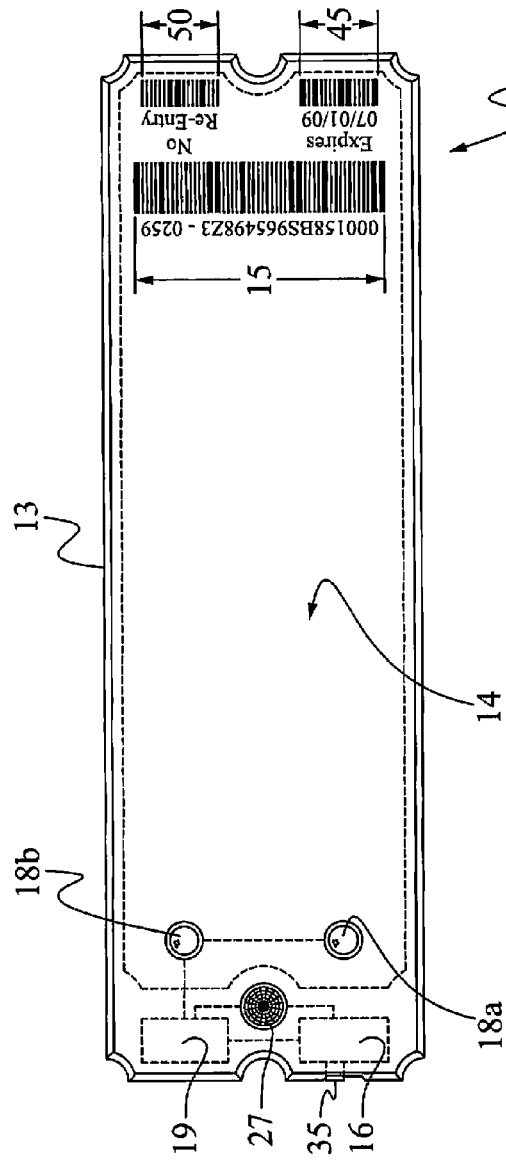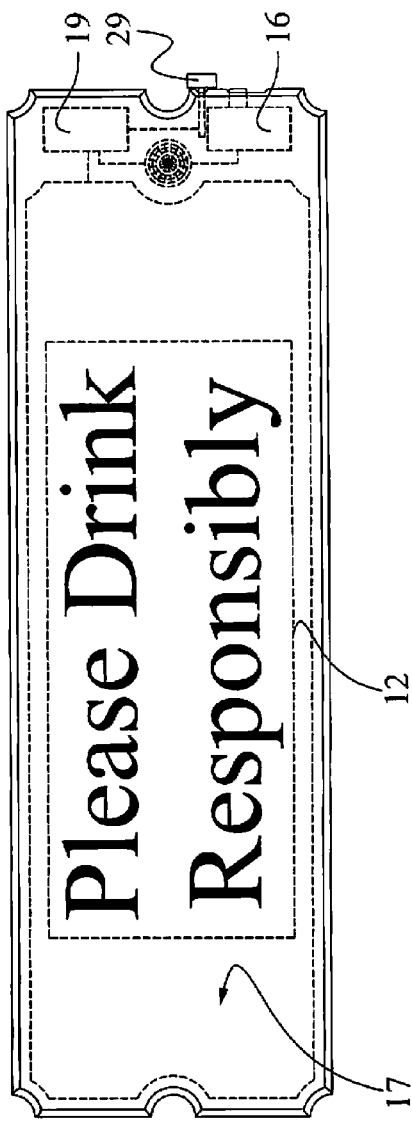
FIGURE 2
FIGURE 3 ations in data storage.
ENTRANCE TICKET WITH LIGHTING EFFECT

FIELD

The present embodiments generally relate to a ticket and a method of use of a ticket that operates to provide admission to a controlled access venue and to create a lighting effect synchronized with other audience members, enabling the holder to gain admission to the venue and to participate with a performance at the venue.

BACKGROUND

A need exists for a dual purpose ticket that can provide for tracking of admissions, controlling access of admissions, as well as enabling a ticket holder to interact with a performance at a controlled access venue, thereby enabling the ticket holder to more fully become involved in a performance.

A need exists for a method of using a dual purpose ticket that can provide for tracking of admissions, controlling access of admissions, as well as enabling a ticket holder to interact with a performance at a controlled access venue, thereby enabling the ticket holder to more fully become involved in a performance.

The present embodiments meet these needs.

BRIEF DESCRIPTION OF THE DRAWINGS

The detailed description will be better understood in conjunction with the accompanying drawings as follows:

FIG. 2 is a front view of the ticket.

FIG. 3 shows a back view of the ticket.

Figure 1A:
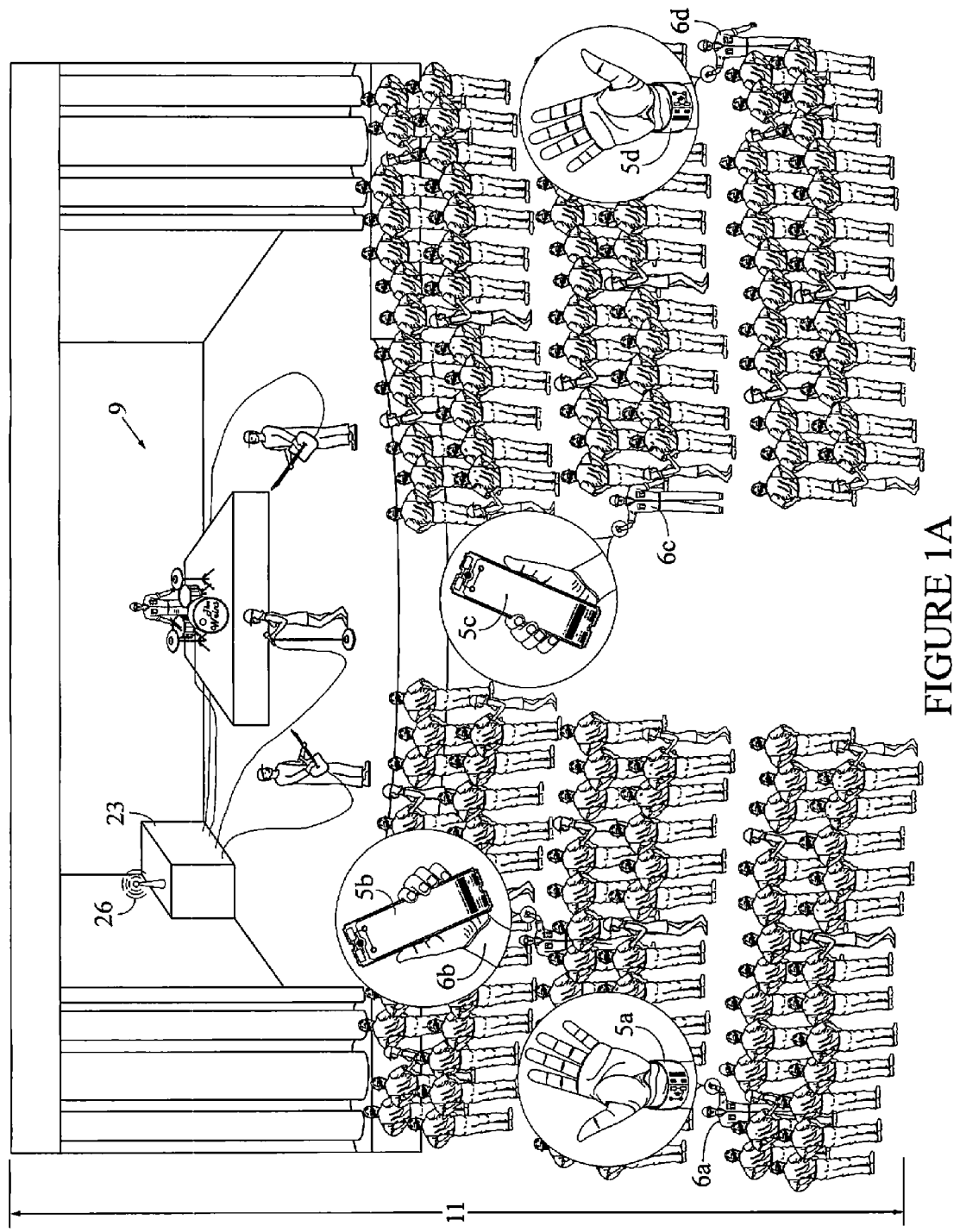
FIG. 1A shows a diagram of a controlled access venue with the tickets for the lighting effect contained in it.

The present embodiments are detailed below with reference to the listed Figures.

DETAILED DESCRIPTION OF THE EMBODIMENTS

Before explaining the present apparatus and method in detail, it is to be understood that the apparatus and method are not limited to the particular embodiments and that the invention can be practiced or carried out in various ways.

The present embodiments relate to a ticket that produces a lighting effect that is usable with a controlled access venue.

The embodiments can use at least one and up to a plurality of tickets at the same time, at a venue.

The tickets can create a synchronously presented lighting effect from an audience in a controlled access venue, such as a music theater or a concert hall, during a performance.

Each of the plurality of tickets can have a substrate with a first side for supporting a readable identification code and a second side for supporting a message such as "don't smoke" or "danger high decibels expected." The substrate can have a thickness less than about 0.4 inches, can weigh less than about 2 ounces, and can be flexible.

The identification code can be a bar code, a numerical code, an alphanumeric code, a radio frequency identification "RFID" tag, or a series of "check digits" used to verify a code, which are known in the warehouse packing industry.

A power source can be disposed or embedded within the substrate, such as a small camera battery or other battery. The power source can be from about 1 volt to about 9 volts and can originate from a battery such as a hearing aid battery, a printable battery, a watch battery, a lithium ion battery, a rechargeable battery, a solar battery, or any other commercially available battery.

At least one light, but up to about 50 lights can be electrically connected to the power source for use during the performance. The light can be a light emitting diode "LED".

A controller with a processor, and a data storage can be disposed in the substrate. The processor can be in communication with the data storage and can further be in electrical communication with the power source and the at least one light.

Computer instructions can be stored in the data storage, which can be used to instruct the processor to operate the lights in a predetermined sequence. The processor can be activated by a musical beat, by a melody, by a pitch line, or the processor can activate as a reaction to the performance on the stage of the controlled access venue. The data storage can be flash memory. The processor can be microprocessor.

The ticket can have an actuator associated with the substrate which can be, in an embodiment, embedded in the substrate for initiating flashing of the lights based on a predetermined set of computer instructions which determine how the lights flash, including the sequence of the flashing.

The actuator can be in direct communication with the processor. The actuator can be a sound receiver which can receive a sound from the stage or a signal from a performance transmitter and can then initiate the lighting effect. The signal from the performance transmitter can be referred to herein as a first signal.

The sound receiver can be a microphone or any other commercially available sound receiver.

The ticket can have an actuator that is a pull tab, which can be disposed at least partially in the substrate acting as a separator between the power source and the processor, so that when the pull tab is removed a connection between the processor and the power source is formed such that the processor can receive power and can utilize the computer instructions on the data storage which determines the sequence of the lighting effect.

In operation, the pull tab can be torn off of the substrate, thereby establishing a circuit between the power source and the processor and sending a signal to initiate the processor. The pull tab can initially be disposed between the power source and the processor, thereby disrupting any electronic signal from communicating between the power source and the processor. Upon removal of the pull tab from the substrate, the pull tab will no longer be disrupting any electronic signal between the power source and processor, allowing the processor to be initiated.

In an embodiment, the pull tab can be disposed on a tear tab, such as a perforated ticket stub. The tear tab can be removed from the ticket or substrate by tearing the tear tab from the ticket or substrate along the perforation. As the tear tab is removed from the substrate, the pull tab is simultaneously removed from the substrate, thereby establishing electrical communication between the power source and the processor. In this manner, the tear tab cannot be reattached to the substrate, thereby ensuring that the ticket is only usable for one performance.

In an embodiment, the actuator can initiate the processor when it receives a second signal from a network transmitter connected to a network to start the lighting sequence or to change a lighting sequence that has been started.

Alternatively, a switch, such as an electronic on/off switch, can be embedded in the substrate or attached to the surface of the substrate. The switch can mechanically initiate the light individually or can initiate the flashing light sequence.

Combinations of actuators can be usable in an embodiment of the ticket.

The processor of each ticket can operate synchronously to create a lighting effect such as three short flashing lights, followed by two long flashing lights, followed by three short light flashes to interact and send a message with music being performed on stage. Another part of the same audience can have different computer instructions, which flash those lights in a counterpoint beat to the first group of audience members. Similarly, there can be a third group of audience members, which can be all with green lights, that flash as a group in between the other flashing lights which can be red or blue. Additional colors or multicolored lights can be usable with the embodiments.

Simultaneously the processors for the plurality of tickets can synchronously operate during the performance all the while serving the dual purpose of controlling access to the controlled access venue. These unique tickets can allow each holder to interactively participate with the performance as a member of the performance with the ticket.

The tickets can be contemplated in an embodiment to have a flexible substrate, which can be reusable. In an embodiment, the flexible substrate can have a thickness of less than about 1 inch, and a weight of less than about 5 ounces.

The first signal can be an audio signal or a wireless signal. In an embodiment, the audio signal can have a preset frequency limit that represents a bass frequency range, a treble frequency range, a sequence of pitches, or a drum beat sequence to initiate the actuator on each of the plurality of tickets.

An embodiment can contemplate that the audio signal and the wireless signal can come from the network, which can be initiated at a predetermined time.

In an embodiment, the auto signal and the wireless signal can be generated by a user, such as by a disc jockey "DJ", an operator, a sound technician, or similar user, by tapping a beat using a mouse, an Ipod™, an Iphone™, or another similar device, which can be in communication with the network, such as with a computer, laptop, personal digital assistant, a cellular phone, or combinations thereof.

The ticket can additionally have an expiration date programmed into the computer instructions in the data storage for deactivating the processor, so that a ticket used for the Beach Boys in New Jersey, on Jun. 22, 2009 can not be used again to see the Beach Boys in Chicago on Jun. 23, 2009.

It can be contemplated that the light can be a light emitting diode (LED), a fluorescent light, a halogen light, a neon light, or combinations thereof.

Another embodiment can contemplate that an electroluminescence coating can be printed on the substrate and can also act as the lighting effect, replacing the light for some uses, and acting in conjunction to the light in other uses. In addition, electroluminescent wire can be used, which can also act as the lighting effect.

If lights are used, the lights can be connected together on the ticket in series, in parallel, or combinations thereof, to the power source.

An embodiment contemplates that the substrate can also include a lighter and the actuator can be a removable pin removable from the lighter to allow the sequence of lights to electrically engage the power source and initiate.

The lighter can have a case, which can be 100 percent engulfed with electroluminescence, electroluminescent wires, or chemi-luminescence paint or a similar coating that appears to glow independently without the need for any additional stimulating light. An embodiment can be contemplated for use with black lights.

In an embodiment, the ticket can be imprinted and a "smart" lighter with a removable pin for engaging the lighter, such as a magnet pin that can be detachable at the venue with a security controllable pin removing device.

In this embodiment, the lighter can also include a microprocessor and data storage, which can also have computer instructions for producing a lighting effect as described previously.

Another embodiment can contemplate that the removable pin can only be removable by a security guard, that the removable pin can in fact be a security controllable pin that can require a security controllable pin removing device that is only used at an entrance to the controlled access venue.

The substrate of the ticket can be contemplated to be one or more of the following types of items: a stiff paper, a non-forming flexible but crystalline plastic, a cardboard sheet, a thin aluminum plate, a flexible metal plate, a rubberized plate or a 2 millimeter thin plate of another flexible but shape supporting synthetic material.

The power source can be a AAA DC battery, a AA battery, a lithium ion battery, a solar cell, a watch battery, a hearing aid battery, or any other commercially available battery. It can be contemplated that the power source can be rechargeable for an embodiment. It can be contemplated that the power source can be replaceable for another embodiment.

It can be contemplated that the power source can be a printable battery, such as one from the Fraunhofer Research Institution for Electronic Nano Systems ENAS, of Germany. This embodiment is environmentally friendly, as the printable battery contains to no mercury.

The ticket can include a substrate that can operate as a wrist band, a neck band, head gear, a neck lanyard, a brooch, a T-shirt, sunglasses, or another wearable ticket with a lighting effect.

An embodiment contemplates that the ticket can have a "no reentry" code, which can prohibit reentry of ticket to the controlled access venue.

In order to more fully understand the ticket, an embodiment of a method of using the ticket can include the steps of:

(a) gaining access to a controlled access venue using a ticket with a substrate, with an actuator embedded within the substrate, wherein the actuator is connected to a power source embedded in the substrate, at least one light embedded in the substrate, a controller with a processor embedded in the substrate, data storage communicating with the processor embedded in the substrate, computer instructions in the data storage for instructing the processor to operate at least one light;

(b) actuating at least one light on the ticket comprising a step selected from the group consisting of: pulling on a pull tab; receiving a first signal from a performance transmitter; tearing off a tear tab disposed on the substrate, wherein a pull tab is disposed on the tear tab; engaging a switch embedded in the substrate; receiving a second signal from a network transmitter connected to a network; actuating a switch disposed on the substrate; and receiving a first signal from a performance venue; and (c) receiving a second signal from a network to synchronously operate each of the least one lights to create a synchronous lighting effect with each processor of each ticket in an audience, while controlling access to the controlled access venue, allowing each member of the audience to interactively participate with a performance.

Turning now to the Figures, FIG. 1A shows a controlled access venue 11 with a plurality of tickets, 5a, 5b, 5c, 5d. Each ticket can be held by a member of the audience 6a, 6b, 6c, 6d. The performance 9 can occur on a stage in front of the audience or can be viewable by the audience. The performance can be remote, or can be electronically connected to the audience in the manner of live aid concerts, which can have remote audiences to the show going on in London.

Also shown in FIG. 1A is a performance transmitter 23 for transmitting a first signal 26.

Figure 1B:
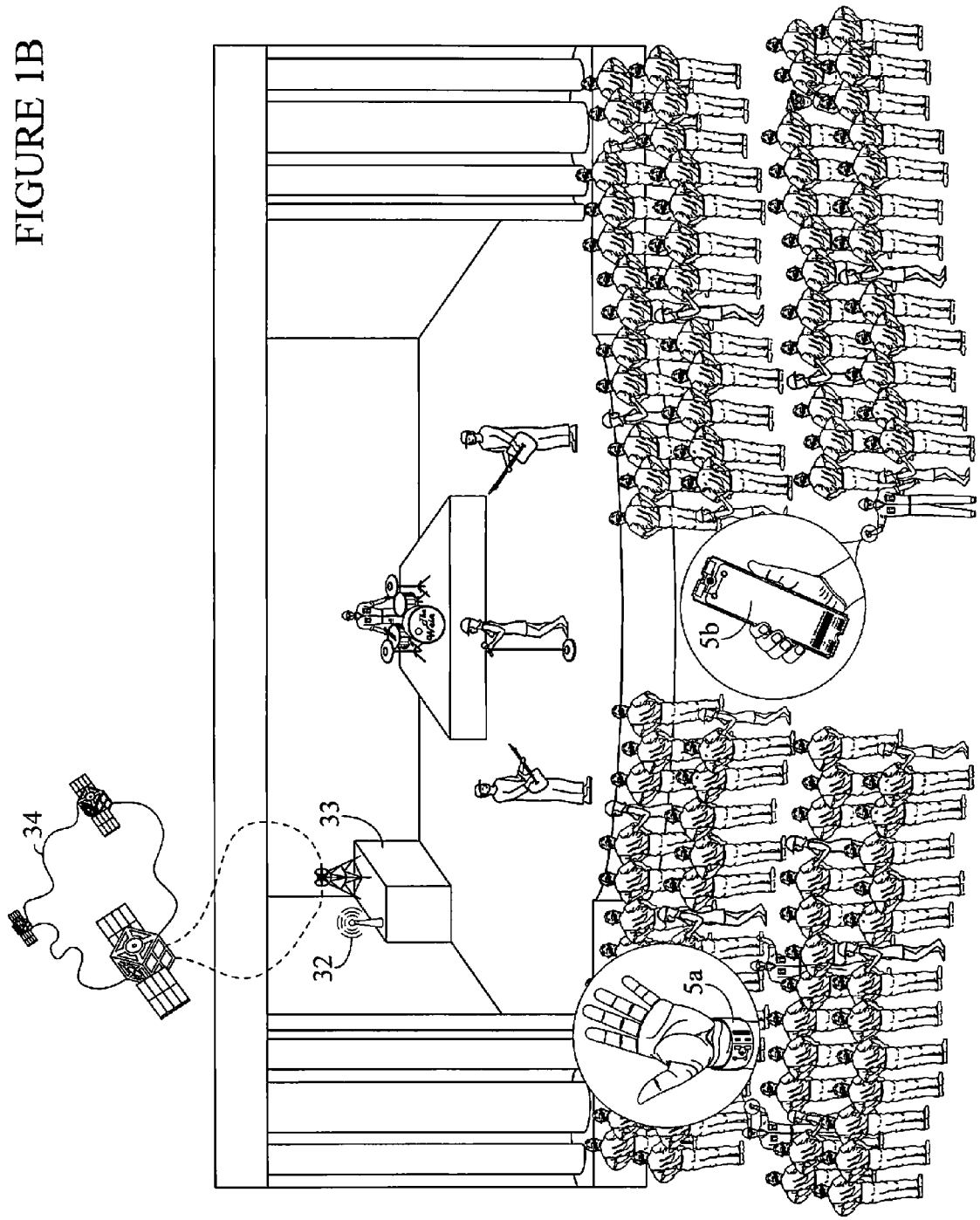
FIG. 1B shows an alternative embodiment of a diagram of a controlled access venue with the tickets for the lighting effect contained in it.

FIG. 1B shows an alternative embodiment of FIG. 1A, with a network 34 in communication with a network transmitter 33 for transmitting a second signal 32 to the plurality of tickets 5a, 5b, 5c, 5d.

FIG. 2 shows a front view of a ticket 5a. The ticket can have a substrate 13, which can be flexible and can be made of a plastic. The plastic can be clear and transparent. The plastic can also be a crystalline polypropylene or homopolymer of polyethylene that can withstand temperatures up to about 112 Fahrenheit without deforming or melting.

The substrate 13 can have a first side 14, which can have a non-removable readable identification code 15. The identification code can be intended to not only be readable by a scanner, such as a bar code, but can be readable or scanned by a human.

In the substrate 13 can have a power source 16 that can be battery. Also in the first side 14 can be a first light 18a and a second light 18b, which can be the same color, different colors, or multicolored. The lights can be connected to the power source 16.

A controller 19 can also be connected to at least one light 18a, 18b, which can be connected in series, in parallel, or combinations thereof. The controller 19 can be in communication with the power source 16.

FIG. 2 also shows the sound receiver 27 which is depicted connected to the power supply 16 and the controller 19. The sound receiver 27 can be a wireless signal receiver, or an infra red detector, which the first signal can be transmitted to via the network.

The ticket is shown with a switch 35 for actuating the lighting effect using the lights. The ticket can also have an expiration date 45 and a no reentry code 50.

It can be contemplated that additional embodiment can have the following features:

FIG. 3 shows the opposite side of the ticket 5a of FIG. 2 with the second side 17 supporting a message 12. This Figure also shows the pull tab 29, which is disposed as a block between the controller 19 and the power source 16. In this embodiment, once the pull tab is pulled or torn, it will remove the block from the power source to the controller and initiate the lighting effect.

Figure 4:
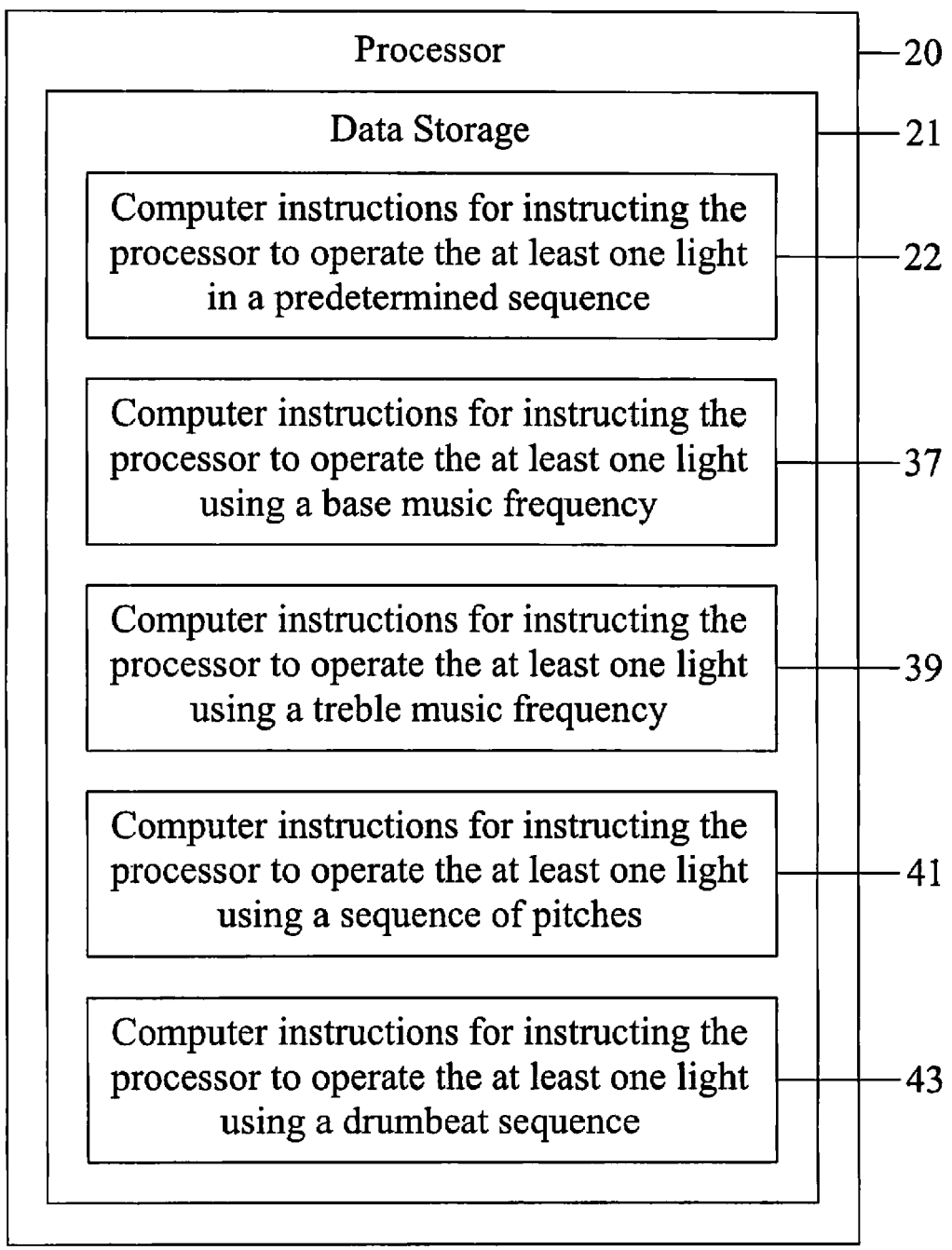
FIG. 4 is a diagram of the processor with computer instructions in data storage.

FIG. 4 shows a processor 20 with data storage 2, which can further have computer instructions 22, which can include computer instructions to instruct the processor to operate the at least one light using a predetermined sequence 22, a bass music frequency 37, a treble music frequency 39, a sequence of pitches 41 or a drumbeat sequence 43.

The lighting effect can be pulsed based on the beat or tempo of the music. The lights can be individually preprogrammed lights with flashing sequences. The lights can be operated based on a seat location and can be based on the audio sequence of the performance.

In an embodiment, certain lights on certain tickets can operate based on the performer, such as group A can operate during the drumbeat sequence, provided by a drummer of the performance, and group B can operate during the bass music frequency, provided by a bassist of the performance.

The lights can change in intensity, color, pulsation, on/off signaling based on the mood of the music, the tempo of the music and the dynamic of the music.

The colors of the lights can further be operated based on sponsorships of the venue.

Figure 5:
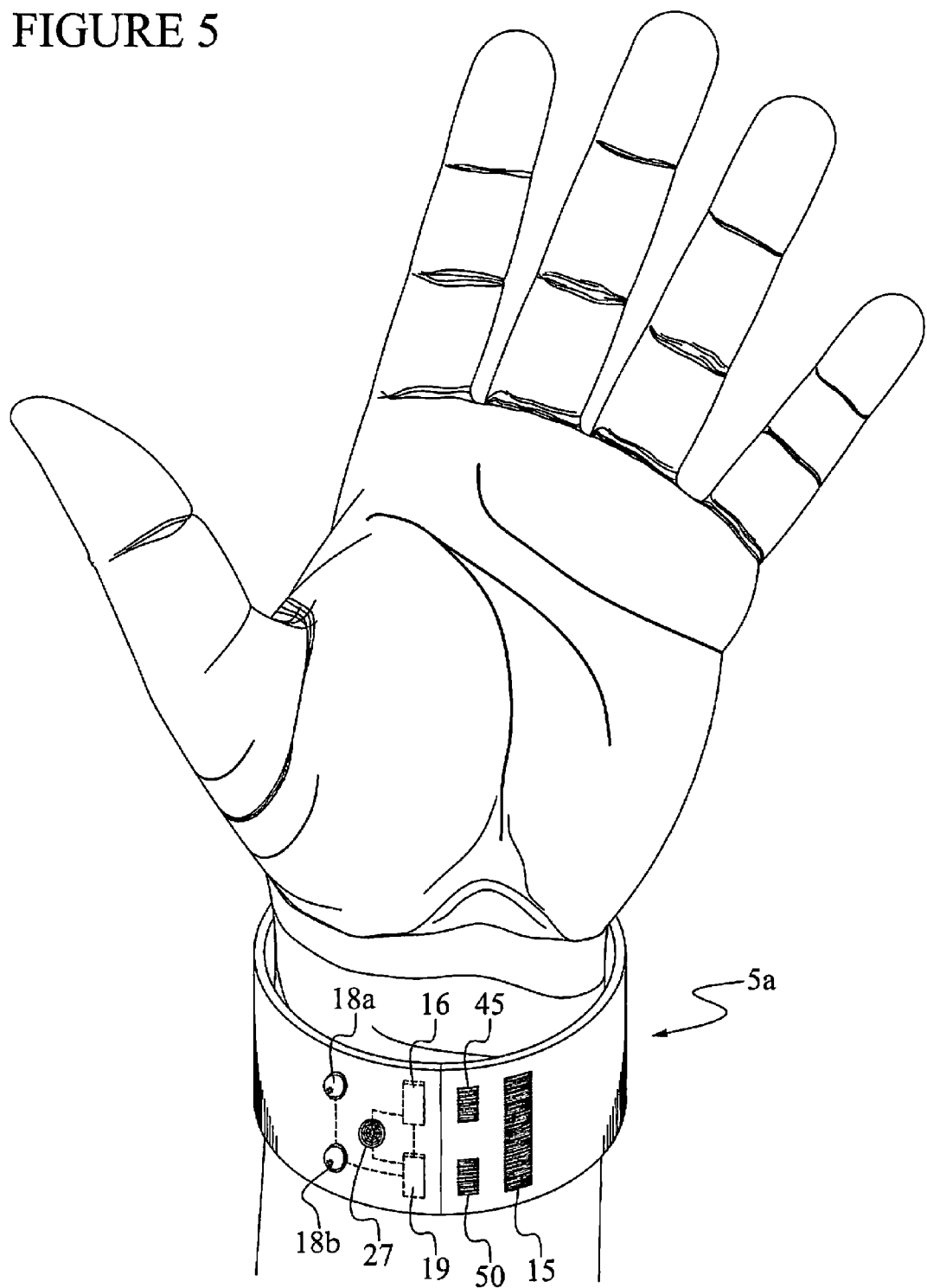
FIG. 5 shows a wristband embodiment of the ticket.

FIG. 5 shows an embodiment of the ticket 5a, wherein the ticket 5a is a wristband. The wristband embodiment of the ticket 5a is further shown with first light 18a and second light 18b in communication with the controller 19 and the power source 16 as previously described in FIGS. 2 and 3.

While these embodiments have been described with emphasis on the embodiments, it should be understood that within the scope of the appended claims, the embodiments might be practiced other than as specifically described herein.

What is claimed is:

1. A plurality of tickets for creating a synchronously presented lighting effect from an audience in a controlled access venue for a performance, wherein each of the plurality of tickets comprises:
   a. a substrate, having a first side adapted to support a readable identification code and a second side for supporting a message;
   b. a power source embedded in the substrate;
   c. at least one light electrically connected to the power source;
   d. a controller with a processor, a data storage, and computer instructions stored in the data storage, for instructing the processor to operate the at least one light in a predetermined sequence; and
   e. an actuator associated with the substrate and in communication with the processor, wherein the actuator initiates the lighting effect, and wherein the actuator is a member of the group consisting of:
      i. a sound receiver embedded in the substrate for receiving a first signal from a performance transmitter;
      ii. a pull tab disposed on the substrate;
      iii. a second signal from a network transmitter connected to a network;
      iv. a switch disposed on the substrate; and
      v. combinations thereof;
   wherein the processor of each ticket operates synchronously to create the lighting effect simultaneously with the plurality of tickets by synchronously operating during the performance and while controlling access to the controlled access venue allowing each holder to interactively participate with the performance.

2. The plurality of tickets of claim 1, wherein the substrate is reusable.

3. The plurality of tickets of claim 1, wherein the substrate has a thickness of less than 1 inch and a weight of less than 5 ounces.

4. The plurality of tickets of claim 1, wherein the first signal is an audio signal or a wireless signal from a network.

5. The plurality of tickets of claim 4, wherein the audio signal has a preset frequency limit that represents a bass frequency range, a treble frequency range, a sequence of pitches, and/or a drum beat sequence to initiate the actuator on each of the plurality of tickets.

6. The plurality of tickets of claim 4, wherein the audio signal and the wireless signal from the network initiate at a predetermined time.

7. The plurality of tickets of claim 1, further comprising an expiration date for deactivating the processor.

8. The plurality of tickets of claim 1, wherein the at least one light is a light emitting diode (LED), a fluorescent light, a halogen light, a neon light, or combinations thereof.

9. The plurality of tickets of claim 1, wherein the at least one light is an electroluminescent coating printed on the substrate in electrical communication with the power source.

10. The ticket of claim 1, wherein the at least one light comprises a plurality of lights connected in series, in parallel, or combinations thereof, to the power source.

11. The ticket of claim 1, wherein the substrate comprises a stiff paper, a non-forming flexible crystalline plastic, a cardboard sheet, a thin aluminum plate, a flexible metal plate, a rubberized plate or a 2 millimeter thin plate of another flexible but shape supporting synthetic material.

12. The ticket of claim 1, wherein the power source is a DC battery, a lithium ion battery, a printable battery, a solar cell battery, or combinations thereof.

13. The ticket of claim 12, wherein the power source is rechargeable.

14. The ticket of claim 12, wherein the power source is replaceable.

15. The ticket of claim 1, wherein the readable identification code is an alphanumeric code, a bar code, or an radio frequency identification tag.

16. The ticket of claim 1, wherein the substrate is a wrist band, a neck band, a head gear, a neck lanyard, a lighter, a brooch, a T-shirt, sunglasses, or another wearable accessory.

17. The ticket of claim 1, further comprising a "no reentry" code for prohibiting reentry of the ticket to the controlled access venue.

18. The ticket of claim 1, wherein the substrate is a flexible substrate.

19. The ticket of claim 1, wherein the pull tab is disposed on a tear tab.

20. A method for creating a lighting effect in a controlled access venue comprising the steps of:
  a. gaining access to a controlled access venue using tickets, wherein each ticket comprises:
    (i) a substrate with an actuator embedded within the substrate;
    (ii) wherein the actuator is connected to a power source embedded in the substrate;
    (iii) at least one light is embedded within the substrate;
    (iv) a controller with a processor embedded within the substrate;
    (v) data storage communicating with the processor embedded within the substrate;
    (vi) computer instructions in the data storage for instructing the processor to operate the at least one light;
  b. actuating the at least one light on each ticket comprising a step selected from the group consisting of:
    i. pulling on a pull tab;
    ii. receiving a first signal from a performance transmitter;
    iii. tearing off a tear tab on the substrate, wherein a pull tab is disposed on the tear tab;
    iv. engaging a switch embedded in the substrate;
    v. receiving a second signal from a network transmitter connected to a network;
    vi. actuating a switch disposed on the substrate; and
    vii. receiving a first signal from a performance venue;
  c. receiving a second signal from a network to synchronously operate each at least one light to create a synchronous lighting effect with each processor of each ticket in an audience, while controlling access to the controlled access venue, allowing each member of the audience to interactively participate with a performance.

* * * * *